United States Patent
Watano et al.

(10) Patent No.: US 12,311,892 B2
(45) Date of Patent: May 27, 2025

(54) IMAGE CAPTURING DEVICE AND LAMP DEVICE

(71) Applicant: KOITO MANUFACTURING CO., LTD., Tokyo (JP)

(72) Inventors: Yuichi Watano, Shizuoka (JP); Shigeyuki Watanabe, Shizuoka (JP); Akinobu Kubota, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 900 days.

(21) Appl. No.: 17/053,843

(22) PCT Filed: May 9, 2019

(86) PCT No.: PCT/JP2019/018595
§ 371 (c)(1),
(2) Date: Nov. 9, 2020

(87) PCT Pub. No.: WO2019/221007
PCT Pub. Date: Nov. 21, 2019

(65) Prior Publication Data
US 2021/0229638 A1     Jul. 29, 2021

(30) Foreign Application Priority Data

May 18, 2018   (JP) .................. 2018-096093
May 18, 2018   (JP) .................. 2018-096095

(51) Int. Cl.
  *B60S 1/60*   (2006.01)
  *B60Q 1/00*   (2006.01)
  *B60R 11/04*  (2006.01)
  *B60S 1/54*   (2006.01)
  *B60S 1/56*   (2006.01)
  *H04N 23/51*  (2023.01)

(52) U.S. Cl.
  CPC .............. *B60S 1/54* (2013.01); *B60Q 1/0005* (2013.01); *B60R 11/04* (2013.01); *H04N 23/51* (2023.01)

(58) Field of Classification Search
  CPC ........................................................ B60S 1/54
  See application file for complete search history.

(56) References Cited

U.S. PATENT DOCUMENTS

2005/0121539 A1   6/2005  Takada et al.
2018/0194328 A1   7/2018  Numakunai
2018/0201231 A1*  7/2018  Tani ................... G02B 27/0006

FOREIGN PATENT DOCUMENTS

EP   1122138 A2 *  8/2001 .............. B60S 1/522
EP   3 508 387 A1  7/2019
JP   S63-065966 A  3/1988
(Continued)

OTHER PUBLICATIONS

Irie, JP-2014201150-A and translation (Year: 2014).*
(Continued)

*Primary Examiner* — Steven S Anderson, II
(74) *Attorney, Agent, or Firm* — Sughrue Mion, PLLC

(57) ABSTRACT

A camera unit is configured to capture an image of an outside area of a vehicle. A translucent cover covers the camera unit. A first air cleaner is configured to jet gas toward an area on the translucent cover located within an angle of view of the camera unit. The first cleaner is located above the area in an up-down direction of the vehicle.

3 Claims, 5 Drawing Sheets

(56) References Cited

FOREIGN PATENT DOCUMENTS

| | | | | | |
|---|---|---|---|---|---|
| JP | 2003-11791 | A | | 1/2003 | |
| JP | 2005-178569 | A | | 7/2005 | |
| JP | 2008-68701 | A | | 3/2008 | |
| JP | 2009-67341 | A | | 4/2009 | |
| JP | 2009-140715 | A | | 6/2009 | |
| JP | 2012-136116 | A | | 7/2012 | |
| JP | 2014201150 | A | * | 10/2014 | |
| JP | 2015137070 | A | * | 7/2015 | |
| JP | 2016-172486 | A | | 9/2016 | |
| JP | 2016-187990 | A | | 11/2016 | |
| JP | 2017-022451 | A | | 1/2017 | |
| JP | 2017-222307 | A | | 12/2017 | |
| JP | 2018-116159 | A | | 7/2018 | |
| JP | 2019-064471 | A | | 4/2019 | |
| WO | WO-2005039932 | A2 | * | 5/2005 | ........... B60R 1/0602 |
| WO | WO-2007057274 | A1 | * | 5/2007 | ........... B60Q 1/0023 |

OTHER PUBLICATIONS

Ina, JP-2015137070-A and translation (Year: 2015).*
Haug, WO-2007057274-A1 and translation (Year: 2007).*
Chudaska, EP1122138 and translation (Year: 2001).*
WO2005039932 and translation (Year: 2005).*
Communication issued on May 30, 2023 by the Japanese Patent Office for Japanese Patent Application No. 2022-184884.
Extended European Search Report dated May 28, 2021, issued by the European Patent Office in counterpart European patent Application No. 19803112.2.
Written Opinion (PCT/ISA/237) issued by the International Searching Authority in corresponding International Application No. PCT/JP2019/018595, on Jul. 23, 2019.
International Search Report (PCT/ISA/210), issued by International Searching Authority in corresponding International Application No. PCT/JP2019/018595, on Jul. 23, 2019.

* cited by examiner

IMAGE CAPTURING DEVICE AND LAMP DEVICE

FIELD

The presently disclosed subject matter relates to an image capturing device adapted to be mounted on a vehicle. The presently disclosed subject matter also relates to a lamp device adapted to be mounted on a vehicle.

BACKGROUND

Patent Document 1 discloses an image capturing device adapted to be mounted on a vehicle for capturing an image of an outside area of the vehicle. As an example of such an image capturing device, Patent Document 1 discloses a configuration in which a camera unit for capturing an image of the outside of the vehicle is disposed in a lamp chamber of a lamp device.

CITATION LIST

Patent Document
Patent Document 1: Japanese Patent Publication No. 2008-068701 A

SUMMARY

Technical Problem

It is demanded to suppress degradation in the information acquisition capability of an image capturing device mounted on a vehicle (first demand).

It is demanded to suppress degradation in the information acquisition capability by a camera unit incorporated in a lamp device mounted on a vehicle (second demand).

Solution to Problem

In order to meet the first demand described above, one illustrative aspect of the presently disclosed subject matter provides an image capturing device adapted to be mounted on a vehicle, comprising:
  a camera unit configured to capture an image of an outside area of the vehicle;
  a translucent cover covering the camera unit; and
  a first air cleaner configured to jet gas toward an area on the translucent cover located within an angle of view of the camera unit,
  wherein the first air cleaner is located above the area in an up-down direction of the vehicle.

Raindrops and/or snow adhering on the area of the translucent cover may disturb the image capturing performed by the camera unit. By jetting air from the first air cleaner toward the area at an appropriate timing, raindrops and/or snow existing at least in the area can be removed. As a result, it is possible to suppress degradation in the information acquisition capability of the image capturing device mounted on the vehicle.

In particular, since the first air cleaner jets air from the upper side toward the area, it is possible to promote dropping of the raindrops and/or snow adhering on the area with the aid of the gravity. In other words, it is possible to remove raindrops and/or snow with a smaller wind pressure. Accordingly, it is possible to suppress an increase in the size and/or power consumption of the first air cleaner. As a result, it is possible to suppress an increase in the size and/or power consumption of the image capturing device.

In order to meet the first demand described above, one illustrative aspect of the presently disclosed subject matter provides an image capturing device adapted to be mounted on a vehicle, comprising:
  a camera unit configured to capture an image of an outside area of the vehicle;
  a translucent cover covering the camera unit;
  a first air cleaner configured to jet gas toward an area on the translucent cover located within an angle of view of the camera unit; and
  a second air cleaner configured to jet gas toward the area from a direction different from the first air cleaner.

According to such a configuration, in a case where raindrops and/or snow adhering on the area of the translucent cover cannot be removed by jetting gas from one direction by the first air cleaner, it is possible to attempt removal by jetting gas from another direction. Accordingly, it is possible to more reliably suppress degradation in the information acquisition capability by the camera unit mounted on the vehicle.

The image capturing device according to each of the above illustrative aspects may comprise a control device configured to selectively operate at least one of the first air cleaner and the second air cleaner based on a speed of the vehicle.

According to such a configuration, the air cleaner capable of more easily and efficiently removing raindrops and/or snow from the area is selectively operated in accordance with the speed of the vehicle. Accordingly, it is possible to secure the field of view of the camera unit through the area with relatively simple processing.

Additionally or alternatively, the image capturing device according to each of the above illustrative aspects may comprise a control device configured to selectively operate at least one of the first air cleaner and the second air cleaner based on an image captured by the camera unit.

Even with such a configuration, the air cleaner capable of more easily and efficiently removing raindrops and/or snow from the area is selectively operated in accordance with the speed of the vehicle. In addition, securing of the field of view of the camera unit through the area can be performed by the image capturing device alone without requiring input of velocity information from the outside.

When the operation of the control device is based on the image captured by the camera unit, a more flexible selective operation of the first air cleaner and the second air cleaner is enabled. For example, when dirt is detected by the control device at a specific position in the area, an air cleaner closer to the position may be selected. The selected air cleaner may jet gas to remove the dirt.

In order to meet the second demand described above, one illustrative aspect of the presently disclosed subject matter provides a lamp device adapted to be mounted on a vehicle, comprising:
  a lamp unit configured to emit visible light to an outside area of the vehicle;
  a camera unit configured to capture an image of an outside area of the vehicle;
  a translucent cover covering the lamp unit and the camera unit; and
  an air cleaner configured to jet gas toward an area on the translucent cover including a first area located within an angle of view of the camera unit, wherein a second area on the translucent cover is configured to allow passage of the visible light emitted from the lamp unit, and adapted to be cleaned by a sprayed cleaning liquid; and wherein the first area is located so as to avoid a third area where the sprayed cleaning liquid can reach.

Dirt and/or foreign matters adhering on the first area of the translucent cover may disturb the image capturing performed by the camera unit. By jetting air from the air cleaner toward an area including the first area at an appropriate timing, dirt and/or foreign matters existing at least in the first area can be removed. As a result, it is possible to suppress degradation in the information acquisition capability by the camera unit incorporated in the lamp device.

It is well-known a liquid-type cleaner for removing dirt and/or foreign matters on a translucent cover of a lamp device that may obstruct lighting by spraying a cleaning liquid toward the translucent cover. The lamp device described above can be used with such a liquid-type cleaner. In the above configuration, the camera unit is disposed such that the first area avoids the third area. Accordingly, it is possible to avoid a situation in which the cleaning liquid sprayed from the liquid-type cleaner enters the angle of view of the camera unit. As a result, it is possible to easily suppress degradation in the information processing capability of the camera unit.

The lamp device described above may be configured such that the air cleaner is located such that the gas can reach the third area.

According to such a configuration, the cleaning liquid in the third area can be kept away from the first area by the wind pressure of the air jetted from the air cleaner and passed through the first area. Accordingly, it is possible to further reliably avoid a situation in which the cleaning liquid sprayed from the liquid-type cleaner enters the angle of view of the camera unit.

The lamp device described above may be configured such that at least one of a location and a shape of the air cleaner is so determined as to block raindrops flowing toward the first area when the vehicle is travelling.

When the vehicle is traveling, raindrops adhering on the vehicle body are moved on the surface of the vehicle body by the driving wind, thereby forming the flows. Such raindrops having reached the first area of the translucent cover may disturb the image capturing performed by the camera unit. By blocking such raindrop flows with the air cleaner, the frequency of the air jetting operation for securing the field of view of the camera unit can be reduced.

As used herein, the term "lamp unit" means a constituent unit of a component that can be distributed by itself as a single unit while providing a desired lighting function.

As used herein, the term "camera unit" means a constituent unit of a component that can be distributed by itself as a single unit while providing a desired image capturing function.

DESCRIPTION OF EMBODIMENTS

Examples of embodiments will be described below in detail with reference to the accompanying drawings. In each of the drawings used in the following description, the scale is appropriately changed in order to make each member have a recognizable size.

In the accompanying drawings, an arrow F represents a forward direction of the illustrated structure. An arrow B represents a rearward direction of the illustrated structure. An arrow U represents an upward direction of the illustrated structure. An arrow D represents a downward direction of the illustrated structure. An arrow L represents a leftward direction of the illustrated structure. An arrow R represents a rightward direction of the illustrated structure. The terms "left" and "right" used in the following descriptions represent the left-right directions as viewed from the driver's seat.

Figure 1:
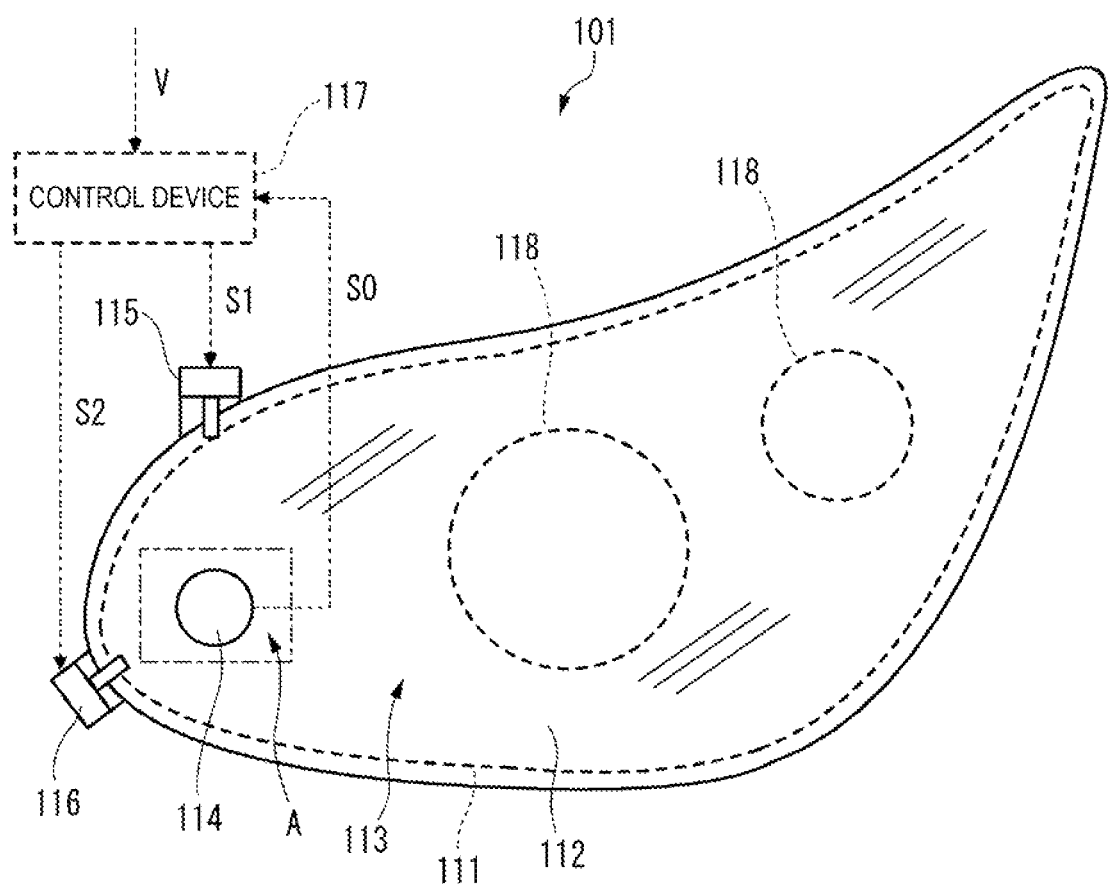
FIG. 1 illustrates a configuration of a left front image capturing device according to an embodiment.
Figure 1:
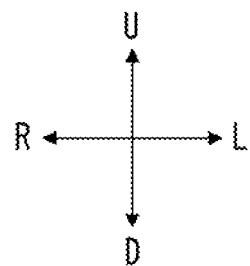

FIG. 1 illustrates a configuration of a left front image capturing device 101 according to an embodiment. The left front image capturing device 101 is disposed in a left front portion LF of the vehicle 10 illustrated in FIG. 2. The left front portion LF is an area located on the left of the center in the left-right direction of the vehicle 10 and on the front of the center in the front-rear direction of the vehicle 10.

As illustrated in FIG. 1, the left front image capturing device 101 includes a housing 111 and a translucent cover 112. The housing 111 defines a chamber 113 together with the translucent cover 112.

The left front image capturing device 101 includes a camera unit 114. The camera unit 114 is accommodated in the chamber 113. The translucent cover 112 covers the camera unit 114.

The camera unit 114 is a device for capturing an image of an outside area of the vehicle 10. The image may include at least one of a still image and a video image. The camera unit 114 may include at least one of a camera sensitive to visible light and a camera sensitive to infrared light. An area A surrounded by a chain line represents an area located within the angle of view of the camera unit 114 at the position of the translucent cover 112.

The left front image capturing device 101 includes a first air cleaner 115. The first air cleaner 115 is supported by the housing 111 or the translucent cover 112 via an appropriate supporting member. The first air cleaner 115 is disposed above the area A in the up-down direction of the vehicle 10. The first air cleaner 115 is configured to jet air from an upper side at least toward the area A.

Raindrops and/or snow adhering on the area A of the translucent cover 112 may disturb the image capturing performed by the camera unit 114. By jetting air from the first air cleaner 115 toward the area A at an appropriate timing, raindrops and/or snow existing at least in the area A can be removed. As a result, it is possible to suppress degradation in the information acquisition capability of the camera unit 114 mounted on the vehicle 10.

In particular, since the first air cleaner 115 jets air from the upper side toward the area A, it is possible to promote dropping of the raindrops and/or snow adhering on the area A with the aid of the gravity. In other words, it is possible to remove raindrops and/or snow with a smaller wind pressure. Accordingly, it is possible to suppress an increase in the size and/or power consumption of the first air cleaner 115. As a result, it is possible to suppress an increase in the size and/or power consumption of the left front image capturing device 101.

The left front image capturing device 101 may include a second air cleaner 116. The second air cleaner 116 is configured to jet gas toward the area A from a direction different from the first air cleaner 115. In the illustrated example, the second air cleaner 116 is disposed so as to jet gas from an obliquely lower right side toward the area A.

According to such a configuration, in a case where raindrops and/or snow adhering on the area A cannot be removed by jetting gas from one direction by the first air cleaner 115, it is possible to attempt removal by jetting gas from another direction. Accordingly, it is possible to more reliably suppress degradation in the information acquisition capability of the camera unit 114 mounted on the vehicle 10.

The left front image capturing device 101 may include a control device 117. The control device 117 may be communicably connected to the first air cleaner 115 and the second air cleaner 116. The control device 117 is configured to be capable of outputting a control signal S1 and a control signal S2. The control signal S1 is a signal for causing the first air cleaner 115 to jet gas. The control signal S2 is a signal for causing the second air cleaner 116 to jet gas.

The control device 117 may be configured to be capable of receiving a velocity signal V indicating the speed of the vehicle 10 from a main ECU or a speed sensor mounted on the vehicle 10. In this case, the control device 117 is configured to selectively operate at least one of the first air cleaner 115 and the second air cleaner 116 based on the speed of the vehicle 10 corresponding to the velocity signal V.

Figure 3A:
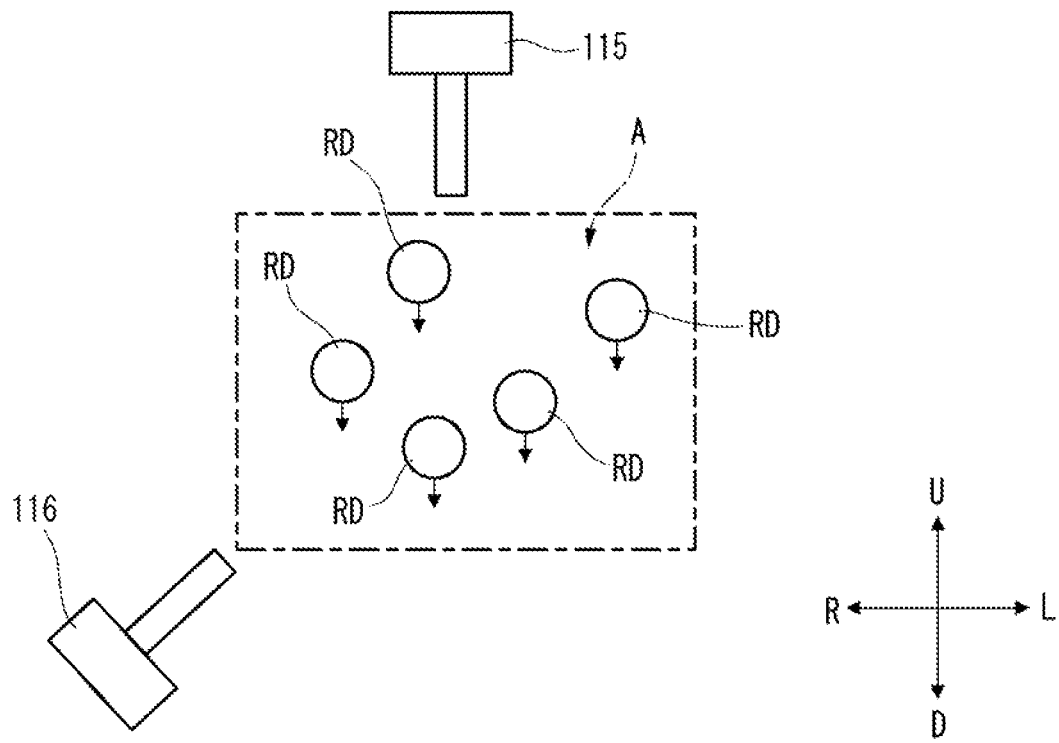
FIG. 3A illustrates an operation of the left front image capturing device of FIG. 1.

FIG. 3A illustrates raindrops RD adhering on the area A of the translucent cover 112 when the vehicle 10 is stopped or traveling at a relatively low speed. The raindrops RD are stationary or displaced downward at a relatively low speed under the influence of gravity.

Figure 3B:
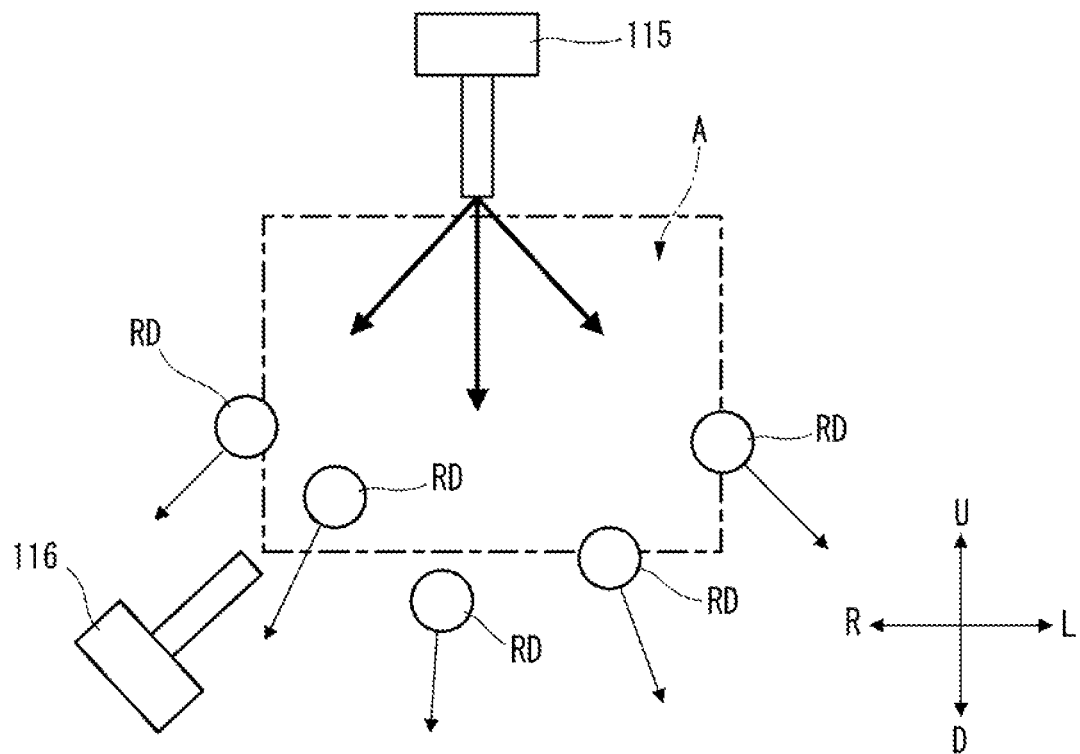
FIG. 3B illustrates an operation of the left front image capturing device of FIG. 1.

For example, when the speed of the vehicle 10 indicated by the velocity signal V is less than a prescribed value, the control device 117 outputs the control signal S1 for operating the first air cleaner 115. As a result, as illustrated in FIG. 3B, gas is jetted from the first air cleaner 115 located above the area A, so that the raindrops RD are prompted to escape from the area A.

Figure 4A:
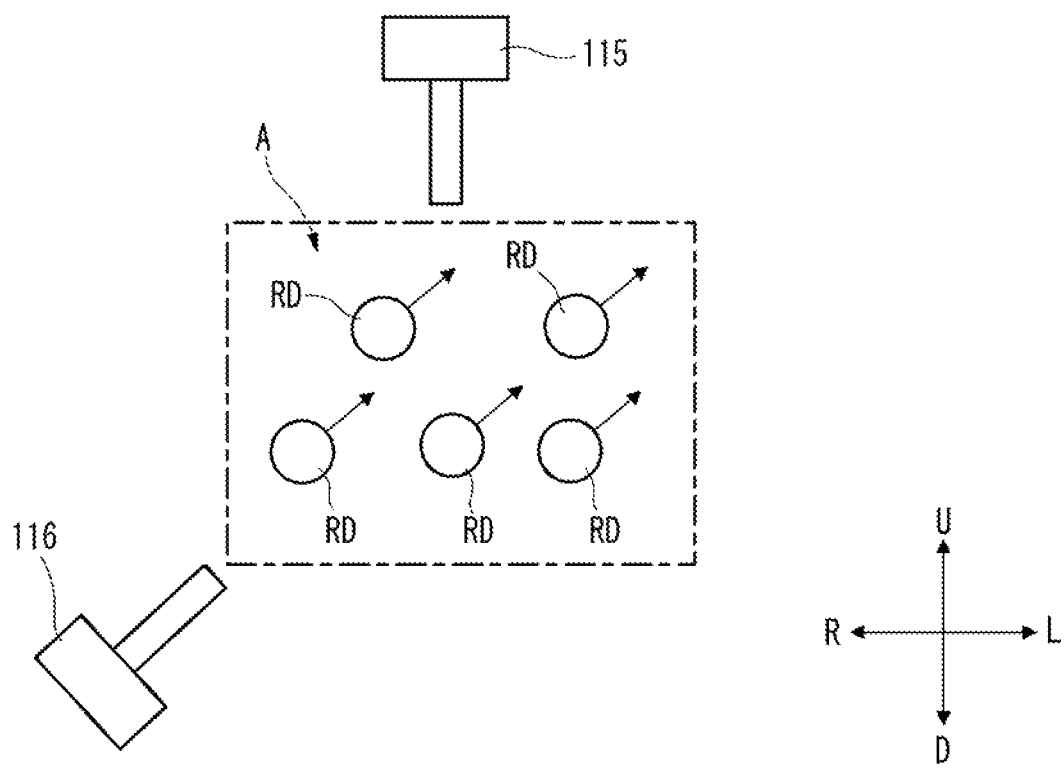
FIG. 4A illustrates an operation of the left front image capturing device of FIG. 1.

FIG. 4A illustrates raindrops RD adhering on an area A of the translucent cover 112 when the vehicle is traveling at a relatively high speed. The raindrops RD are moving on the surface of the translucent cover 112 with the driving wind. In the illustrated example, the raindrops RD are moving to an obliquely upper left side.

Figure 4B:
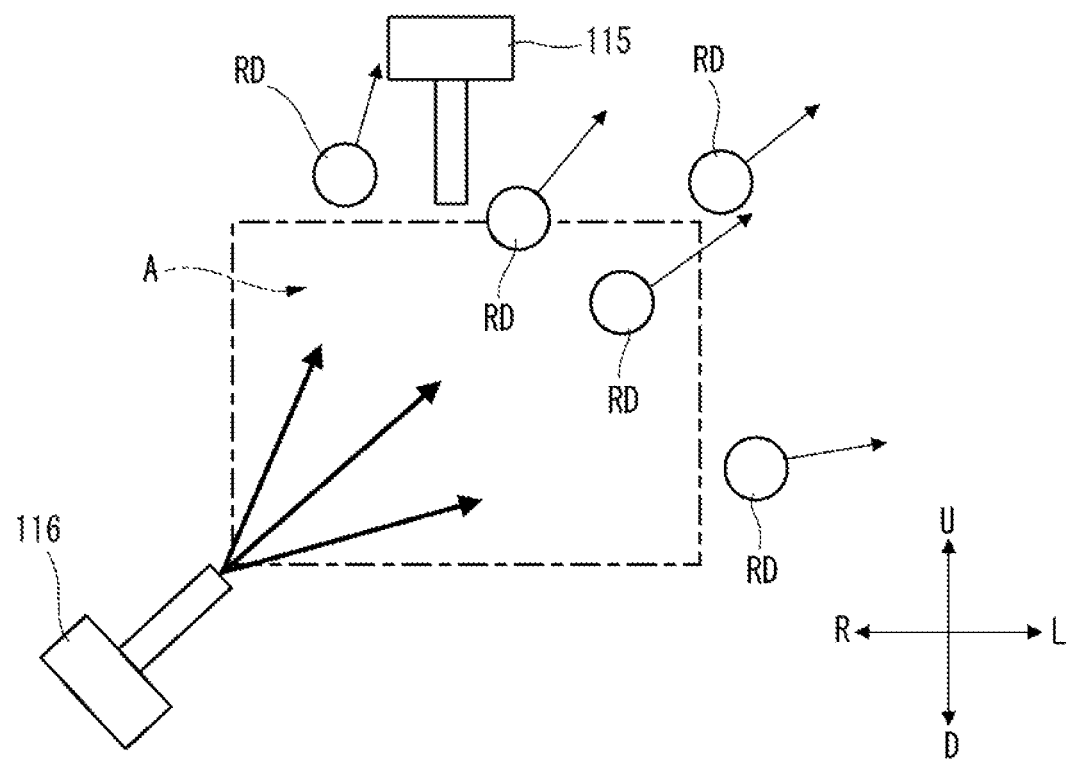
FIG. 4B illustrates an operation of the left front image capturing device of FIG. 1.

For example, when the speed of the vehicle 10 indicated by the velocity signal V is no less than the prescribed value, the control device 117 outputs the control signal S2 for operating the second air cleaner 116. As a result, as illustrated in FIG. 4B, gas is jetted from the second air cleaner 116 located in the obliquely lower right side of the area A, so that the raindrops RD are prompted to escape from the area A.

That is, the air cleaner capable of more easily and efficiently removing raindrops and/or snow from the area A is selectively operated in accordance with the speed of the vehicle 10. Accordingly, it is possible to secure the field of view of the camera unit 114 through the area A with relatively simple processing.

Additionally or alternatively, the control device 117 may be communicatively coupled to the camera unit 114. The camera unit 114 is configured to output a sensing signal S0 corresponding to the captured image. The control device 117 is configured to be capable of receiving the sensing signal S0.

In this case, the control device 117 is configured to selectively operate at least one of the first air cleaner 115 and the second air cleaner 116 based on the image captured by the camera unit 114. That is, the control device 117 is configured to output at least one of the control signal S1 and the control signal S2 based on the sensing signal S0 received from the camera unit 114.

The control device 117 may include an input interface and a processor capable of performing image processing. The input interface receives the sensing signal S0 from the camera unit 114, and converts the sensing signal S0 into a state in which the image processing by the processor is enabled. The motions of the raindrops RD in the area A may be detected by image processing of the processor.

If the detected motions of the raindrops RD are in the manner illustrated in FIG. 3A, the processor determines that the vehicle 10 is stopping or traveling at a relatively low speed. As illustrated in FIG. 3B, the control device 117 then causes the first air cleaner 115 to jet gas.

If the detected motions of the raindrops RD are in the manner illustrated in FIG. 4A, the processor determines that the vehicle 10 is traveling at a relatively high speed. As illustrated in FIG. 4B, the control device 117 then causes the second air cleaner 116 to jet gas.

Even with such a configuration, the air cleaner capable of more easily and efficiently removing raindrops and/or snow from the area A is selectively operated in accordance with the speed of the vehicle 10. In addition, securing of the field of view of the camera unit 114 through the area A can be performed by the left front image capturing device 101 alone without requiring input of the velocity signal V from the outside.

When the operation of the control device 117 is based on the image captured by the camera unit 114, a more flexible selective operation of the first air cleaner 115 and the second air cleaner 116 is enabled. For example, when dirt is detected at a specific position in the area A by the image processing of the processor, an air cleaner closer to the position may be selected. The selected air cleaner jets gas to remove the dirt.

The functions of the above-described processor may be implemented by a general-purpose microprocessor configured to cooperate with a general-purpose memory. Examples of the general-purpose microprocessor include a CPU, an MPU, and a GPU. A general-purpose microprocessor may include a plurality of processor cores. Examples of the general-purpose memory include a ROM and a RAM. The ROM may store a program for executing the processing described above. The program may include an artificial intelligence program. Examples of the artificial intelligence program may include a neural network trained with deep learning. The general-purpose microprocessor may designate at least a part of the program stored in the ROM, load the program on the RAM, and execute the processing described above in cooperation with the RAM. Alternatively, the functions of the above-described processor may be implemented by a dedicated integrated circuit such as a microcontroller, an FPGA, an ASIC, or the like.

The above-described embodiments are merely examples for facilitating understanding of the presently disclosed subject matter. The configuration according to the above embodiments can be appropriately modified without departing from the gist of the presently disclosed subject matter.

In the above embodiment, two air cleaners are provided. From the viewpoint of facilitating the removal of foreign matters in the area A by allowing the gas to be jetted from a plurality of directions toward the area A, the first air cleaner 11S need not necessarily be disposed above the area A in the up-down direction of the vehicle 10. In addition, three or more air cleaners may be provided according to the specifications of the vehicle 10 and the left front image capturing device 101.

Figure 2:
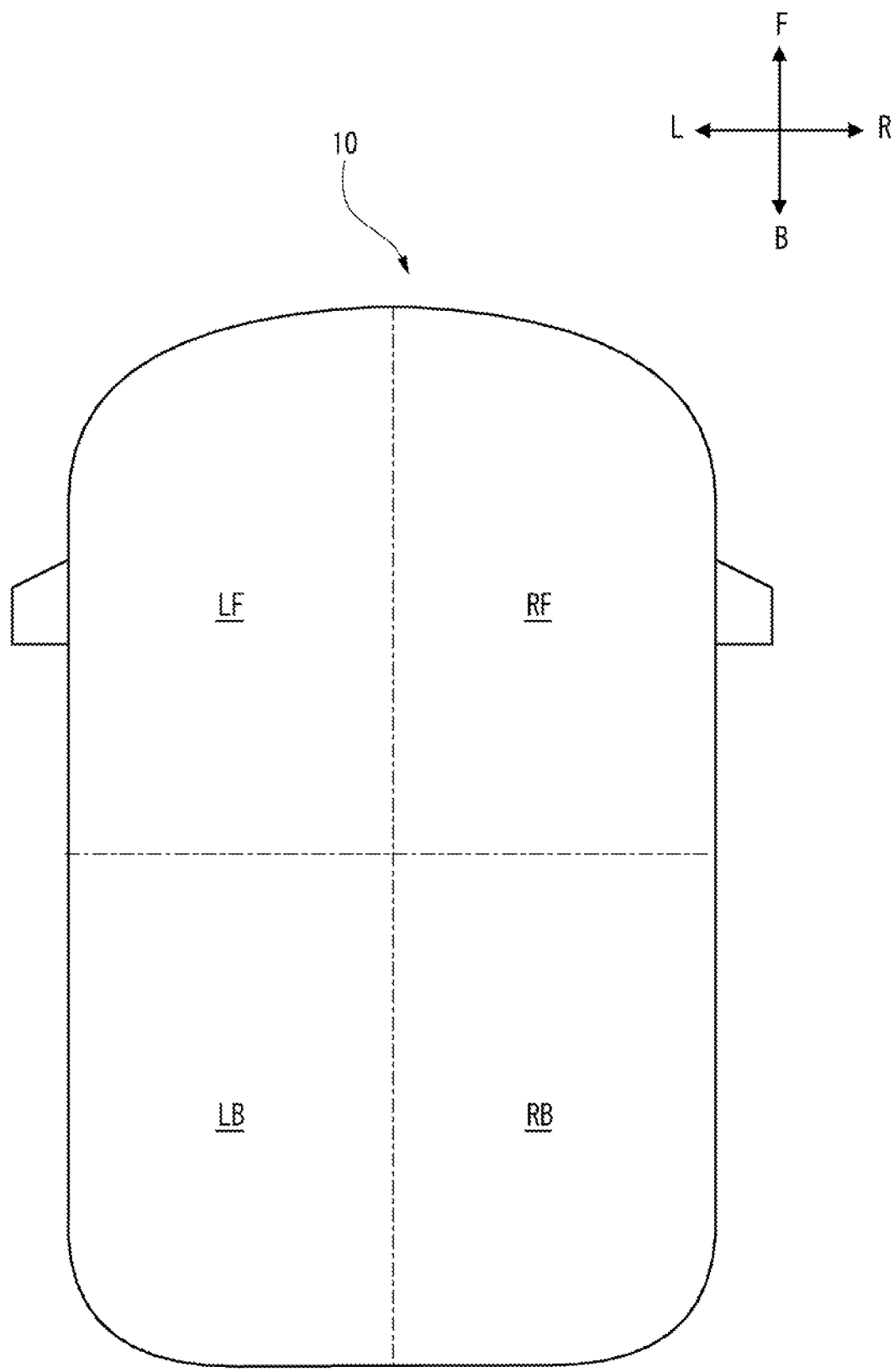
FIG. 2 illustrates a position of the left front image capturing device of FIG. 1 in a vehicle.

A right front image capturing device having a configuration symmetrical with the left front image capturing device 101 illustrated in FIG. 1 relative to the left-right direction may be mounted on a right front portion RF of the vehicle 10 illustrated in FIG. 2. The right front portion RF is an area located on the right of the center in the left-right direction of the vehicle and on the front of the center in the front-rear direction of the vehicle 10.

The configuration of the left front image capturing device 101 is also applicable to a left rear image capturing device. The left rear image capturing device is adapted to be mounted on a left rear portion LB of the vehicle 10 illustrated in FIG. 2. The left rear portion LB is an area located on the left of the center in the left-right direction of the vehicle 10 and on the rear of the center in the front-rear direction of the vehicle 10. The basic configuration of the left rear image capturing device may be symmetrical with the left front image capturing device 101 relative to the front-rear direction.

The configuration of the left front image capturing device 101 is also applicable to a right rear image capturing device. The right rear image capturing device is adapted to be mounted on the right rear portion RB of the vehicle 10 illustrated in FIG. 2. The right rear portion RB is an area located on the right of the center in the left-right direction of the vehicle 10 and on the rear of the center in the front-rear direction of the vehicle 10. The basic configuration of the right rear image capturing device may be symmetrical with the left rear image capturing device described above relative to the left-right direction.

As illustrated in FIG. 1, a lamp unit 118 may be accommodated in the chamber 113. The lamp unit 118 is a device for emitting visible light to the outside of the vehicle 10. Examples of the lamp unit 118 may include a headlamp unit, a clearance lamp unit, a direction indicator lamp unit, a fog lamp unit, a stop lamp unit, and a brake lamp unit.

The number of the camera unit 114 to be accommodated in the chamber 113 may be plural. In this case, at least one air cleaner may be provided for each camera unit 114, or gas may be jetted from one air cleaner toward a plurality of areas A set for the camera units 114.

The camera unit 114 need not necessarily be accommodated in the housing 111. The camera unit 114 may be disposed behind a windshield and/or a door visor of the vehicle 10. The windshield and/or the door visor may be an example of the translucent cover.

Figure 5:
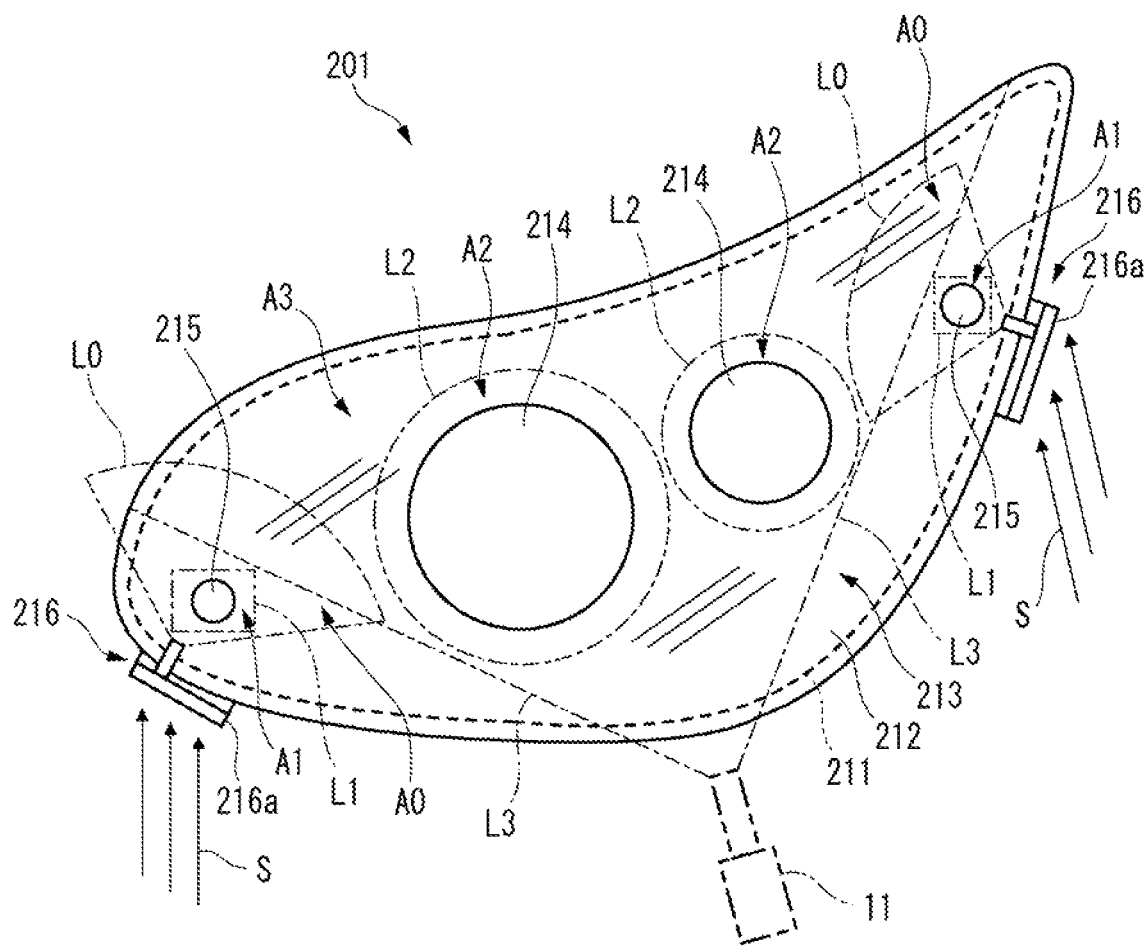
FIG. 5 illustrates a configuration of a left front lamp device according to an embodiment.

FIG. 5 illustrates a configuration of a left front lamp device 201 according to an embodiment. The left front lamp device 201 may be disposed in the left front portion LF of the vehicle 10 illustrated in FIG. 2.

As illustrated in FIG. 5, the left front lamp device 201 includes a housing 211 and a translucent cover 212. The housing 211 defines a lamp chamber 213 together with the translucent cover 212.

The left front lamp device 201 includes a lamp unit 214 and a camera unit 215. The lamp unit 214 and the camera unit 215 are accommodated in the lamp chamber 213. The translucent cover 212 covers the lamp unit 214 and the camera unit 215.

The lamp unit 214 is a device for emitting visible light to the outside of the vehicle 10. Examples of the lamp unit 214 may include a headlamp unit, a clearance lamp unit, a direction indicator lamp unit, and a fog lamp unit.

The camera unit 215 is a device for capturing an image of an outside area of the vehicle 10. The image may include at least one of a still image and a video image. The camera unit 215 may include at least one of a camera sensitive to visible light and a camera sensitive to infrared light. A first area A1 surrounded by a chain line L1 represents an area located within the angle of view of the camera unit 215 at the position of the translucent cover 212.

The left front lamp device 201 includes an air cleaner 216. The air cleaner 216 is supported by the housing 211 or the translucent cover 212 via an appropriate supporting member. The air cleaner 216 is configured to jet air at least toward the first area A1. An area A0 surrounded by a chain line L0 represents an area to which the air jetted from the air cleaner 216 can reach.

Dirt and/or foreign matters adhering on the first area A1 of the translucent cover 212 may disturb the image capturing performed by the camera unit 215. By jetting air from the air cleaner 216 toward the area A0 including the first area A1 at an appropriate timing, dirt and/or foreign matters existing at least in the first area A1 can be removed. As a result, it is possible to suppress degradation in the information acquisition capability of the camera unit 215 incorporated in the left front lamp device 201.

It is well-known a liquid-type cleaner for removing dirt and/or foreign matters on a translucent cover of a lamp device that may obstruct lighting by spraying a cleaning liquid toward the translucent cover. The left front lamp device 201 can be used with such a liquid-type cleaner 11.

A second area A2 surrounded by a chain line L2 represents an area through which the light emitted from the lamp unit 214 passes at the position of the translucent cover 212. The liquid-type cleaner 11 is configured to spray a cleaning liquid to clean at least the second area A2. A third area A3 located between the two chain lines L3 represents an area to which the cleaning liquid can reach with the driving wind or the like.

In the present embodiment, the camera unit 215 is disposed so that the first area A1 avoids the third area A3. Accordingly, it is possible to avoid a situation in which the cleaning liquid sprayed from the liquid-type cleaner 11 enters the angle of view of the camera unit 215. As a result, it is possible to easily suppress degradation in the information processing capability of the camera unit 215.

As illustrated in FIG. 5, in the present embodiment, a part of the area A0 overlaps with the third area A3. That is, the air cleaner 216 is disposed so that the jetted air reaches the third area A3.

According to such a configuration, the cleaning liquid in the third area A3 can be kept away from the first area A1 by the wind pressure of the air jetted from the air cleaner 216 and passed through the first area A1. Accordingly, it is possible to further reliably avoid a situation in which the cleaning liquid sprayed from the liquid-type cleaner 11 enters the angle of view of the camera unit 215.

In the present embodiment, at least one of the arrangement and the shape of the air cleaner 216 is determined so as to block raindrop flows S toward the first area A1 when the vehicle 10 is traveling. For example, the air cleaner 216 may include a wall-shaped portion 216a extending in the vicinity of the boundary between the vehicle body and the translucent cover 212.

When the vehicle 10 is traveling, raindrops adhering on the vehicle body are moved on the surface of the vehicle body by the driving wind, thereby forming the flows S. Such raindrops having reached the first area A1 of the translucent cover 212 may disturb the image capturing performed by the camera unit 215. By blocking such raindrop flows S with the air cleaner 216, the frequency of the air jetting operation for securing the field of view of the camera unit 215 can be reduced.

In the above embodiment, two camera units 215 are accommodated in the lamp chamber 213. However, the number of camera units 215 accommodated in the lamp chamber 213 may be any number of one or more.

The location and the air jetting direction of the air cleaner 216 are not limited to the direction illustrated in FIG. 5. As long as air can be jetted toward an area A0 including the first area A1 disposed so as to avoid the third area A3, the location and the air jetting direction of the air cleaner 216 can be appropriately determined according to the specifications of the vehicle 10 and the left front lamp device 201.

A right front lamp device having a configuration symmetrical with the left front lamp device 201 illustrated in FIG. 5 relative to the left-right direction may be mounted on the right front portion RF of the vehicle 10 illustrated in FIG. 2.

The configuration of the left front lamp device 201 is also applicable to a left rear lamp device. The left rear lamp device is adapted to be mounted on the left rear portion LB of the vehicle 10 illustrated in FIG. 2. The basic configuration of the left rear lamp device may be symmetrical with the left front lamp device 201 relative to the front-rear direction. In this case, a stop lamp unit, a brake lamp unit, and a direction indicator lamp unit may be mounted as the lamp unit 214.

The configuration of the left front lamp device 201 is also applicable to a right rear lamp device. The right rear lamp device is adapted to be mounted on the right rear portion RB of the vehicle 10 illustrated in FIG. 2. The basic configuration of the right rear lamp device may be symmetrical with the left rear lamp device described above relative to the left-right direction.

The present application is based on Japanese Patent Application No. 2018-096093 filed on May 18, 2018, and Japanese Patent Application No. 2018-096095 filed on May 18, 2018, the entire contents of which are incorporated herein by reference.

The invention claimed is:

1. A lamp device adapted to be mounted on a vehicle, comprising:
   a lamp unit configured to emit visible light to an outside area of the vehicle;
   a camera unit configured to capture an image of an outside area of the vehicle;
   a translucent cover covering the lamp unit and the camera unit;
   an air cleaner configured to jet gas toward an area on the translucent cover including a first area located within an angle of view of the camera unit, the area being a projection range of the jetted gas; and
   a liquid-type cleaner configured to spray cleaning liquid toward another area on the translucent cover including a second area that allows passage of the visible light emitted from the lamp unit,
   wherein the first area is located outside of a third area on the translucent cover such that the third area does not extend into the angle of the camera unit, the third area being a projection range of the sprayed cleaning liquid; and
   wherein the area is located such that at least a portion of the area overlaps with the third area while not overlapping with the second area.

2. The lamp device according to claim 1,
   wherein at least one of a location and a shape of the air cleaner is so determined as to block raindrops flowing toward the first area when the vehicle is travelling.

3. The lamp device according to claim 1,
   wherein the air cleaner includes a wall-shaped portion extending along a boundary between a body of the vehicle and the translucent cover.

* * * * *